US010690135B2

(12) United States Patent
Lee

(10) Patent No.: US 10,690,135 B2
(45) Date of Patent: Jun. 23, 2020

(54) VACUUM PUMP WITH COOLING APPARATUS

(71) Applicant: In Cheol Lee, Hwaseong-si (KR)

(72) Inventor: In Cheol Lee, Hwaseong-si (KR)

(*) Notice: Subject to any disclaimer, the term of this patent is extended or adjusted under 35 U.S.C. 154(b) by 281 days.

(21) Appl. No.: 15/548,312

(22) PCT Filed: Sep. 7, 2016

(86) PCT No.: PCT/KR2016/010018
§ 371 (c)(1),
(2) Date: Aug. 2, 2017

(87) PCT Pub. No.: WO2017/052114
PCT Pub. Date: Mar. 30, 2017

(65) Prior Publication Data

US 2018/0030983 A1 Feb. 1, 2018

(30) Foreign Application Priority Data

Sep. 24, 2015 (KR) ........................ 10-2015-0135156

(51) Int. Cl.
*F03C 2/00* (2006.01)
*F03C 4/00* (2006.01)
(Continued)

(52) U.S. Cl.
CPC ................ *F04C 29/04* (2013.01); *F01P 3/20* (2013.01); *F04C 2/10* (2013.01); *F04C 15/00* (2013.01);
(Continued)

(58) Field of Classification Search
CPC .. F04C 2/10; F04C 15/00; F04C 18/16; F04C 18/18; F04C 25/02; F04C 28/28;
(Continued)

(56) References Cited

U.S. PATENT DOCUMENTS 4,983,106 A * 1/1991 Wright ................ F04C 15/0092 418/84
2005/0019169 A1* 1/2005 Kriehn ................ F04C 15/0092 418/84
(Continued)

FOREIGN PATENT DOCUMENTS

DE 202010015306 U1 3/2011
JP H11-336684 A 12/1999
(Continued)

OTHER PUBLICATIONS

International Search Report dated Dec. 12, 2016 corresponding to International Application No. PCT/KR2016/010018.
(Continued)

*Primary Examiner* — Theresa Trieu
(74) *Attorney, Agent, or Firm* — Hauptman Ham, LLP

(57) ABSTRACT

The present invention relates to a technology of efficiently cooling a vacuum pump that produces a vacuum in a process chamber of a semiconductor manufacturing facility. The present invention provides a new type of vacuum pump cooling method that keeps the internal temperature of a vacuum pump at a predetermined level by circulating oil through rotors of the vacuum pump, such that it is possible to prevent a rapid increase in the temperature of the vacuum pump and smoothly lubricate bearings at the early stage of operation, whereby it is possible to ensure stability when performing processes and operating the pump and economically maintain the facility.

15 Claims, 7 Drawing Sheets

30 15 16 17 54 41 37 35 34 10 13a 12 14 36 16 17 13a'-1 15 43 41 40 54 18 13b 31 34 22 32 21 46 42 47 39 11 35 13b'-1 33 Micro Process 48

(51) Int. Cl.

| | |
|---|---|
| ***F04C 15/00*** | (2006.01) |
| ***F04C 29/04*** | (2006.01) |
| ***F04C 25/02*** | (2006.01) |
| ***F25B 21/02*** | (2006.01) |
| ***F04C 18/18*** | (2006.01) |
| ***F04C 2/10*** | (2006.01) |
| ***F04C 29/02*** | (2006.01) |
| ***F01P 3/20*** | (2006.01) |
| ***F04C 28/28*** | (2006.01) |
| *F01P 5/12* | (2006.01) |
| *F01P 11/04* | (2006.01) |
| *F01P 11/08* | (2006.01) |
| *F01P 11/16* | (2006.01) |
| *F01P 3/00* | (2006.01) |
| *F04C 18/16* | (2006.01) |

(52) U.S. Cl.

CPC .............. *F04C 18/18* (2013.01); *F04C 25/02* (2013.01); *F04C 28/28* (2013.01); *F04C 29/021* (2013.01); *F04C 29/025* (2013.01); *F04C 29/028* (2013.01); *F04C 29/042* (2013.01); *F25B 21/02* (2013.01); *F01P 5/12* (2013.01); *F01P 11/04* (2013.01); *F01P 11/08* (2013.01); *F01P 11/16* (2013.01); *F01P 2003/006* (2013.01); *F04C 18/16* (2013.01); *F04C 29/02* (2013.01); *F04C 2220/12* (2013.01); *F04C 2240/81* (2013.01); *F25B 2321/023* (2013.01); *F25B 2321/0212* (2013.01); *F25B 2321/0252* (2013.01); *Y02P 80/156* (2015.11)

(58) Field of Classification Search

CPC ...... F04C 29/02; F04C 29/021; F04C 29/025; F04C 29/028; F04C 29/04; F04C 29/042; F04C 2220/12; F04C 2240/81; Y02P 80/156; F01P 3/20; F01P 5/12; F01P 11/04; F01P 11/08; F01P 11/16; F01P 2003/006; F25B 21/02; F25B 2321/0212; F25B 2321/023; F25B 2321/0252

USPC ......... 418/2, 83–85, 88–89, 94, 97–99, 101, 418/201.1

See application file for complete search history.

(56) References Cited

U.S. PATENT DOCUMENTS

| | | | | |
|---|---|---|---|---|
| 2009/0191082 A1* | 7/2009 | Yoshimura .......... | F04C 15/0092 | 418/84 |
| 2013/0058823 A1* | 3/2013 | Ohmi ...................... | F04C 18/16 | 418/201.1 |

FOREIGN PATENT DOCUMENTS

| | | |
|---|---|---|
| KR | 10-0347228 B1 | 8/2002 |
| KR | 1585859 A | 2/2005 |
| KR | 10-0517788 B1 | 9/2005 |
| KR | 10-0750848 B1 | 8/2007 |
| KR | 10-0846162 B1 | 7/2008 |
| KR | 10-0892530 B1 | 4/2009 |
| KR | 10-1120887 B1 | 2/2012 |
| KR | 10-1129774 B1 | 3/2012 |
| KR | 10-2013-0125703 A | 11/2013 |

OTHER PUBLICATIONS

Written Opinion dated Dec. 12, 2016 corresponding to International Application No. PCT/KR2016/010018.

Chinese Office Action dated Apr. 17, 2019, in connection with the Chinese Patent Application No. 201680030727.1.

Chinese Office Action dated Aug. 30, 2018, in connection with the Chinese Patent Application No. 2016800307271.

Chinese Office Action dated Oct. 21, 2019, in connection with the Chinese Patent Application No. 201680030727.1.

* cited by examiner

VACUUM PUMP WITH COOLING APPARATUS

CROSS REFERENCE TO RELATED APPLICATION

This application claims the priority of Korean Patent Application No. 10-2015-0135156 filed on Sep. 24, 2015, in the Korean Intellectual Property Office, the disclosure of which is incorporated herein by reference. Further, this application is the National Phase application of International Application No. PCT/KR2016/010018 filed Sep. 7, 2016, which designates the United States and was published in Korean.

TECHNICAL FIELD

The present invention relates to a vacuum pump with a cooling apparatus, and more particularly, to a vacuum pump that can be efficiently cooled or heated for process characteristics to vacuumize a process chamber of a semiconductor manufacturing facility.

BACKGROUND ART

In general, a semiconductor manufacturing facility is a facility that selectively and repeatedly performs processes such as etching, diffusion, chemical vapor deposition, ion injection, and metal deposition on a wafer.

Etching, diffusion, and chemical vapor deposition of the processes performed by a semiconductor manufacturing facility are processes that inject a process gas into a sealed process chamber under a predetermined atmosphere so that the process gas reacts with a wafer in the process chamber. Most of semiconductor manufacturing processes are performed under vacuum and the vacuum should be maintained at a predetermined level to perform precise semiconductor manufacturing processes.

Pressure is a very important factor in processes of manufacturing semiconductor devices and, low pressure, for example, a low vacuum or high vacuum state, is required for most semiconductor manufacturing processes.

A different degree of vacuum is required for each of semiconductor manufacturing processes and one or more vacuum pumps are used, depending on the required degrees of vacuumization, to evacuate a process gas from a process chamber.

For example, a pumping apparatus is necessarily required to lower the pressure inside a process chamber or maintain a process chamber at low pressure in a heat treatment process such as deposition or diffusion of semiconductor manufacturing processes, and a vacuum pump that produces a vacuum using torque from a rotor is generally used as the pumping apparatus.

A vacuum pump usually includes a cylindrical pump housing body and a pump housing base coupled to the lower end of the pump housing body. Further, a motor is disposed at the center, a rotor is rotatably coupled to the driving shaft of the motor, and a stator is disposed around the rotor.

Accordingly, when the rotor is rotated by the motor, a high vacuum pressure is generated between screws having opposite angles to the stator, so a gas remaining in a process chamber is smoothly discharged by the vacuum pressure.

When operating to generate vacuum pressure, a vacuum pump generates high heat, so cooling apparatuses having various cooling methods or cooling structures are used to protect vacuum pumps from high heat.

For example, various cooling apparatuses for a vacuum pump have been disclosed in Korean Patent Nos. 10-1120887, 10-0517788, and 10-1129774.

Therefore, an aspect of the preset invention is to provide a cooling apparatus for a vacuum pump that can effectively cool a vacuum pump under a high-heat environment.

DISCLOSURE

Technical Problem

Various aspects of the present invention are to provide a vacuum pump with a cooling apparatus that can prevent a rapid increase in temperature of a vacuum pump, can secure stability in processes and operation of the pump, for example, by smoothly lubricating a bearing at the early stage of operation, and can be economically maintained, by applying a new vacuum pump cooling type that can maintain the internal temperature of a vacuum pump at a predetermined level by circulating oil in a rotor of the vacuum pump.

One aspect of the present invention is to provide a vacuum pump with a cooling apparatus that can improve cooling efficiency and can be designed optimally for the circumstance of a factor by applying an external or internal pump for circulating oil for cooling a vacuum pump and applying a heat exchange method using cooling water or a Peltier device.

Another aspect of the present invention is to provide a vacuum pump with a cooling apparatus that can increase the operation efficiency of the vacuum pump by automatically changing the temperature of oil, depending on the flow rate of a gas that is sucked into a pump by checking rotor temperature and oil temperature.

The other aspect of the present invention is to provide a vacuum pump with a cooling apparatus that can secure stable operation of a vacuum pump by appropriately controlling housing temperature and can cope with various processes by controlling the housing temperature by supplying oil to a cooling block or a jacket having an oil channel and being installed around a pump housing or a bearing housing.

Technical Solution

A vacuum pump with a cooling apparatus provided by the present invention has the following features.

The vacuum pump with a cooling apparatus includes: a pump housing having an inlet for receiving gas and an outlet for discharging gas; a pair of rotors supported at both ends in the pump housing and generating vacuum pressure by rotating in mesh with each other; a motor connected to a shaft of one of the rotors to drive the rotors; and gears for cooperation between the rotors.

In particular, holes are formed in parallel along axial lines of the rotors, oil supply pipes are disposed in the holes, oil is supplied into the oil supply pipes from an oil supply unit, and the oil cools the rotors while flowing through the holes.

The oil supply unit may be composed of an oil pan for keeping a predetermined amount of oil, an oil pump pumping the oil in the oil pan, and a heat exchanger for heat exchange of the oil pumped into the oil supply pipes by the oil pump.

The oil pump of the oil supply unit may be an external pump disposed outside the pump housing or an internal pump disposed inside a gear housing of the pump housing.

The internal oil pump may use rotor power and may be operated by power transmitted between an oil pump-side pump driving gear and a rotor-side pump driving gear that are rotated in mesh with each other.

The oil supply unit may have an oil circulation configuration including a main oil line extending through the oil pan→oil pump→heat exchanger→oil supply pipes→rotor holes→oil pan in the gear housing.

The heat exchanger of the oil supply unit may be a water-cooling heat exchanger using cooling water or a heat exchanger using a Peltier device. An oil block may be disposed at a heat absorption side of a Peltier device, and a cooling fan and a cooler may be disposed at a heat generation side of the Peltier device in the heat exchanger using a Peltier device. Alternatively, an oil block may be disposed at a heat absorption side of a Peltier device and a cooling block through which cooling water can flow may be disposed at a heat generation side of the Peltier device in the heat exchanger using a Peltier device.

An oil outlet though which oil that has finished cooling comes out may be formed at the holes formed in shafts of the rotors and the oil outlets may be positioned close to the gears fitted on the shafts of the rotors so that oil discharged from the oil outlets is sprayed to the gears and cools the gears.

The vacuum pump may include a first temperature sensor disposed at a gas inlet side of the pump housing to detect temperature of gas, a second temperature sensor disposed in a main oil line of the oil supply unit to detect temperature of oil, a third temperature sensor disposed around the pump housing to detect environmental temperature, and a micro processor variably controlling temperature of oil on the basis of temperature values input from the first temperature sensor, the second temperature sensor, and the third temperature sensor.

A first cooling block may be disposed around the pump housing, a 3-way valve may be disposed in a main oil line extending from the oil supply unit, and a first sub-oil line diverging from the 3-way valve may be connected to the first cooling block of the pump housing so that the pump housing can be cooled and then the rotors and bearings can be cooled by oil supplied to the first cooling block.

The first sub-oil line may be divided into a plurality of lines and connected to a second cooling block formed around bearing housings or a cooling block formed around the gear housing so that not only the pump housing, but the bearing housings or the gear housing can be cooled.

A second sub-oil line may extend from the first cooling block and may be connected to the main oil line behind the 3-way valve so that the rotors can be cooled after the pump housing is cooled.

Advantageous Effects

The vacuum pump with a cooling apparatus provided by the present invention has the following advantages.

First, since the rotors or the bearings of the vacuum pump are cooled by circulating oil, it is possible to prevent a rapid increase in temperature of the vacuum pump, whereby it is possible to secure stability when performing processes and operating the pump and to set the pump temperature to fit to the characteristics of processes.

Second, since an external vacuum pump or an internal vacuum pump is used for circulating oil for cooling a vacuum pump, it is possible to appropriately select a pump to fit to the specifications or layout of a facility and increase spatial usability.

Third, since a heat exchange method using a Peltier device other than a heat exchange method using cooling water is used for heat exchange with oil, it is possible to improve heat exchange efficiency of oil and increase cooling efficiency of a pump. Further, the vacuum pump can be used under an environment without cooling water by applying the cooling method using a Peltier device.

In particular, by heating oil at the early state of operation of a pump through a heat exchange type using a Peltier device, it is possible to more smoothly lubricate bearings with oil of which the temperature has been increased.

Fourth, by applying a method that automatically controlling the temperature of oil in accordance with the flow rate of oil that is sucked into the pump, it is possible to increase operation efficiency of the vacuum pump and appropriately control not only oil temperature but pump temperature to fit to the processes.

Fifth, it is possible to increase productivity by increasing the operation ratio of a facility by appropriately controlling the temperature of a vacuum pump, and particularly, it is possible to reduce the maintenance cost for the pump as low as possible.

BEST MODE

Hereinafter, the present invention is described in detail with reference to the accompanying drawings.

Figure 1:
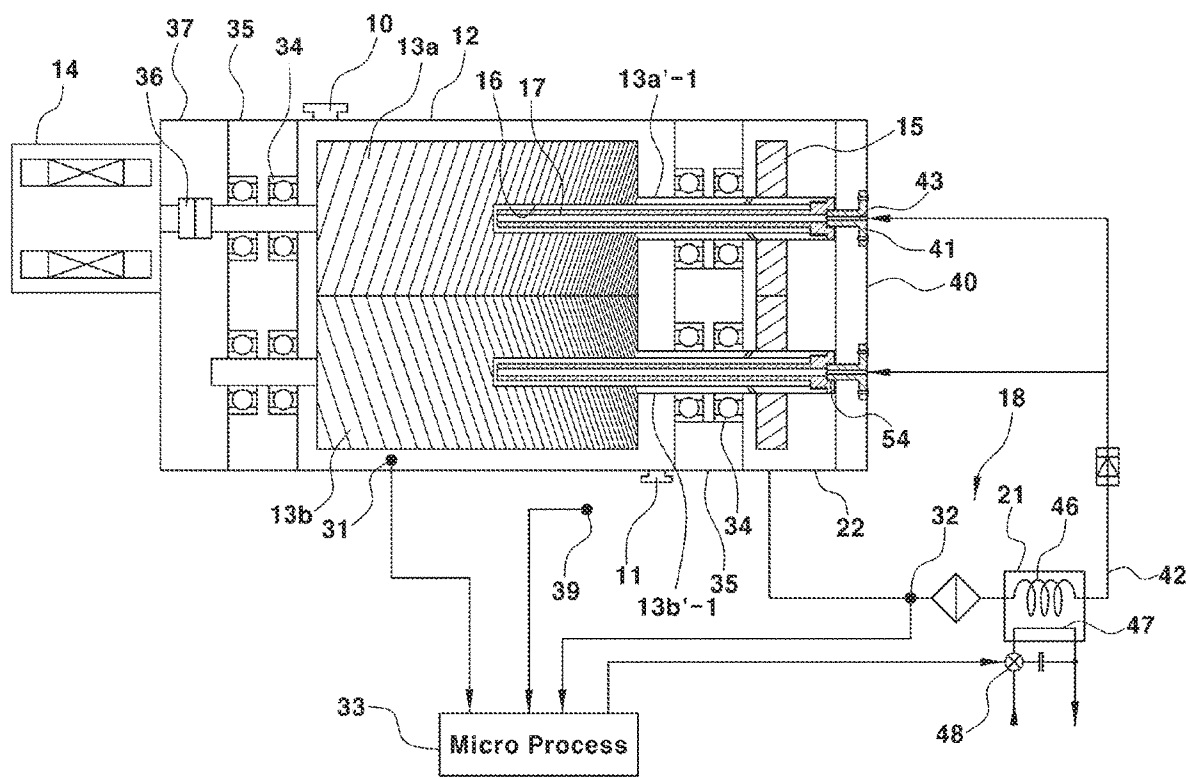
FIG. 1 is a cross-sectional view showing a vacuum pump with a cooling apparatus according to an embodiment of the present invention.
Figure 2:
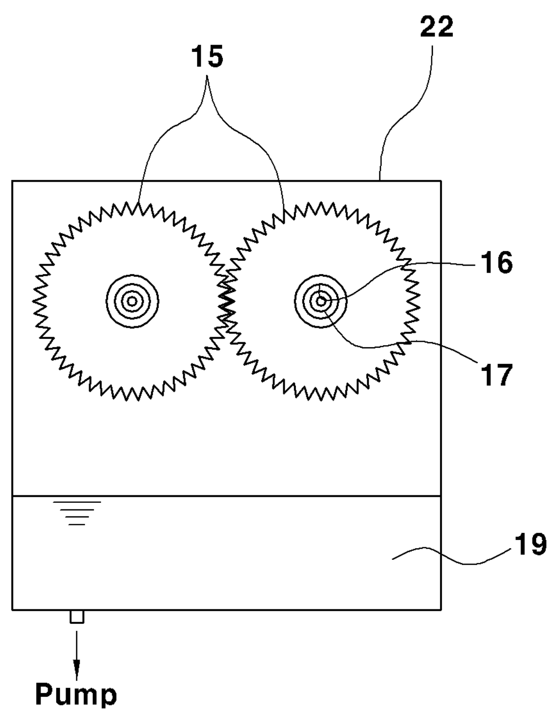
FIG. 2 is a cross-sectional view taken along line A-A of FIG. 1.

FIGS. 1 and 2 are plan view and a side cross-sectional view showing a vacuum pump with a cooling apparatus according to an embodiment of the present invention.

As shown in FIGS. 1 and 2, a vacuum pump with a cooling apparatus includes a pump housing 12 providing a space for keeping rotors for generating vacuum pressure.

An inlet 10 for receiving gas from a process chamber and an outlet 11 for discharging gas to the outside are formed respectively at the front and rear ends of the pump housing 12.

Accordingly, when the rotor is operated, gas flowing in the housing through the inlet 10 can be sent backward by vacuum pressure generated by rotors 13*a* and 13*b* and discharged out of the housing through the outlet 11.

In particular, bearing housings 35 in which bearings 34 for rotatably supporting the rotors 13*a* and 13*b* are integrally formed at the front and rear ends of the pump housing 12. Further, a coupling housing 37 and a gear housing 22 in which a coupler 36 and gears 15 are disposed, respectively, are connected to the bearing housings 35 at the front and rear ends of the pump housing 12.

The housings, that is, the pump housing 12, bearing housing 35, coupling housing 37, and gear housing 22 are isolated from each other.

The bottom inside the gear housing 22 having the gears 15 therein functions as an oil pan 19, the oil pan 19 is always filled with a predetermined amount of oil for cooling the rotors and bearings and lubricating the bearings, and the oil in the oil pan 19 can be supplied to an oil pump 20 through a main oil line connected to the oil pan 19.

The vacuum pump with a cooling apparatus includes a pair of rotors 13*a* and 13*b* that generates vacuum pump by rotating in mesh with each other.

The rotors 13*a* and 13*b*, which are threaded rotors having shafts 13*a*'-1 and 13*b*'-1 at both ends, are horizontally arranged in parallel in the pump housing 12 and are supported at both shafts 13*a*'-1 and 13*b*'-1 on both ends by the bearings 34 in the bearing housings 35.

The rotors 13*a* and 13 may have threads having the same pitch throughout the entire length or may have threads having pitches that gradually decreases as they go to any one side, for example, to the rear end, that is, the rotors may have threads with various pitches.

In particular, the rotors 13*a* and 13*b* have a hole 16 for receiving oil for cooling and the holes 16 are longitudinally famed in parallel along the axes of the rotors 13*a* and 13*b* to guide oil to the centers of the rotors.

The holes 16 may be formed longitudinally throughout the rotors 13*a* and 13*b*, but are preferably formed in a section at which temperature is increased relatively high, for example, the section with small pitches in the entire length of the rotors 13*a* and 13*b*.

In the present invention, for example, the holes 16 are formed from one end, that is, the rear end to the middle portion of each of the rotors 13*a* and 13*b* so that the rear sections with small pitches are intensively cooled.

Oil outlets 30 for discharging oil that has cooled the rotors 13*a* and 13*b* are formed at the holes 16 formed in the shafts 13*a*'-1 and 13*b*'-1 of the rotors 13*a* and 13*b*.

The oil outlets 30 may be formed orthogonally toward the front sides of the gears 15 or perpendicular to the axial lines, close to the gears 15 fitted on the shafts 13*a*'-1 and 13*b*'-1 of the rotors 13*a* and 13*b*, for example, at the rear ends of the shafts 13*a*'-1 and 13*b*'-1 fitted in the gears 15.

Accordingly, the oil discharged from the oil outlets 30 of the holes 16 can be sprayed to the gears 15 from the rotating shafts 13*a*'-1 and 13*b*'-1, so it is possible to cool the gears 15 too using the oil that has cooled the rotors and the bearings.

Further, the oil sprayed to the gears 15 through the oil outlets 30 sticks to the walls of the gear housing 22 and flows into the bearings 34 adjacent to the walls of the gear housing 22 while flowing down on the walls, whereby the bearings 34 can be lubricated by the oil.

A space for preventing oil from directly flowing down may be formed over the bearings so that the oil can be sufficiently supplied into the bearings.

Further, the vacuum pump with a cooling apparatus includes an oil supply pipe 17 for delivering oil for cooling into the holes 16 in the rotors 13*a* and 13*b*.

The oil supply pipes 17 are disposed coaxially in the holes 16 of the rotors 13*a* and 13*b* and the rear ends of the oil supply pipes 17 are fastened to or fitted in the shafts 13*a*'-1 and 13*b*'-1 on the rear ends of the rotors 13*a* and 13*b*, so they can be rotated together.

An adaptor cover 40 is coupled to the rear end of the gear housing 22, adaptors 41 are fastened to the rear side of the adaptor cover 40, and the front ends of the adaptors 41 are in contact with the oil supply pipes 17 through the adaptor cover 40.

For example, adapter seats 54 are formed at the rear ends of the oil supply pipes 17 and the front ends of the adaptors 40 are inserted in the adaptor seats 54 with a predetermined gap therebetween.

An O-ring (not shown) may be disposed at the joints between the adaptor seats 54 and the adaptors 40, and even if there is no O-ring, oil leaking from the fine gaps can drop into the oil pan 19 under them.

The front ends of the oil supply pipes 17 are spaced from the dead ends of the holes 16 in the rotors and the outer sides of the oil supply pipes 17 are also spaced from the inner sides of the holes 16. Accordingly, the oil flowing out of the front ends of the oil supply pipes 17 can cool the bearings in addition to the rotors 13*a* and 13*b* while flowing backward through the gaps between the oil supply pipes 17 and the holes 16.

An orifice 43 is formed in each of the adaptors 41 and the orifices 43 can communicate with the oil supply pipes 17.

Accordingly, the oil supplied from an oil supply unit 18 can be sent to the oil supply pipes 17 through the orifices 43 of the adaptors 41.

Further, the vacuum pump with a cooling apparatus includes a motor 14 and the gears 15 for operating the rotors 13*a* and 13*b*.

The motor 14 is disposed outside the pump housing 12, that is, on the front side of the coupler housing 37 mounted on the front end of the pump housing 12 and the shaft of the motor 14 is connected to the front shaft of one rotor 13*a* of the pair of rotors 13*a* and 13*b* by a coupling 36 in the coupler housing 37.

Alternatively, the shaft of the motor 14 and the front shaft of the rotor 13*a* may be directly connected to each other.

The gears 15 are mounted on the rear shafts of the pair of rotors 13*a* and 13*b*, respectively, and disposed in the gear housing 22 to rotate in mesh with each other.

Accordingly, when the rotor 13*a* is rotated by the motor 14 of which the output is controlled by a micro processor 33, the other rotor 13*b* is rotated by engagement of the gears 15, so vacuum pressure is generated by rotation of the pair of rotors 13*a* and 13*b* rotating in mesh with each other and gas can be sent into the housing and the discharged out of the housing.

Further, the vacuum pump with a cooling apparatus includes the oil supply unit 18 for supplying and supplying oil for cooling the rotors.

The oil supply unit 18 includes the oil pan 19 for keeping a predetermined amount of oil, an oil pump 20 controlled by the micro processor 33 to pump the oil in the oil pan 19, and a heat exchanger 21 for heat exchange of the oil pumped into the oil supply pipes 17 by the oil pump 20.

The main oil line 42 extending from the oil pan 19 formed on the bottom inside the gear housing 22 is connected to the oil pump 20. The main oil line 42 extends to the heat exchanger 21 through a filter. Further, the main oil line 42 coming out of the heat exchanger 21 is connected to the orifices 43 of the adaptors 41 in the adapter cover 40 through a floor switch or a sensor.

Accordingly, the oil supply unit 18 can make an oil circulation configuration that continuously circulates the main oil line circulating through the oil pan 19→oil pump 20→heat exchanger 21→oil supply pipes 17→rotor holes 16→oil pan 19.

The oil pump 20 for pumping oil in the oil supply unit 18 may be an external oil pump or an internal oil pump. An external oil pump is disposed outside the pump housing 12 and connected to the oil pan 19 and the main oil line and an internal oil pump is disposed adjacent to the oil pan 19 in the gear housing 22.

In particular, the oil pump 20 is an internal type; it is operated by torque from the rotors 13*a* and 13*b*.

The internal oil pump 20 may be a rotary pump type, a gear pump type, and a vane pump type, and an internal gear pump type of gear pump type, for example, an internal gear pump type that is the same as the type that is used for an automotive engine oil pump is used in the present invention.

Figure 3:
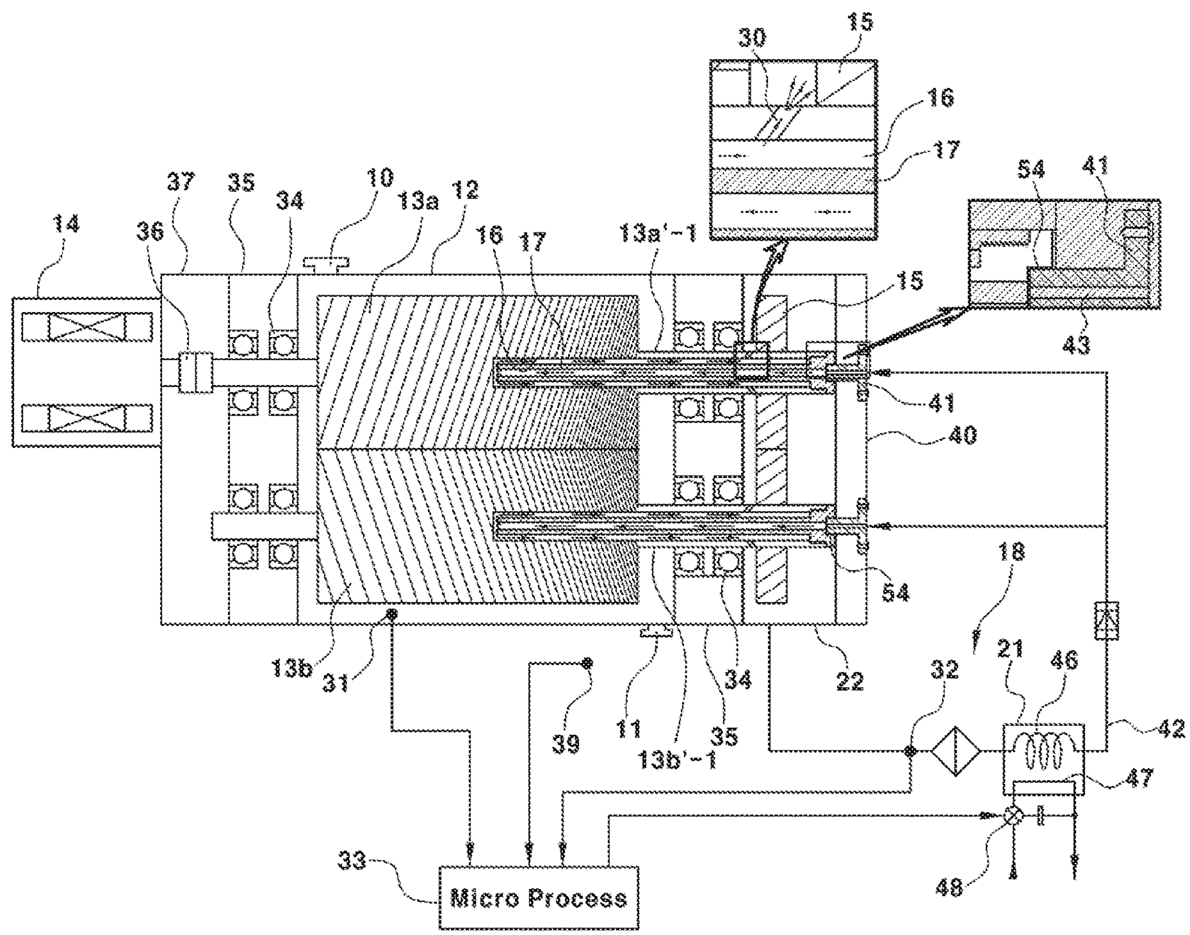
FIG. 3 is a cross-sectional view showing a vacuum pump with a cooling apparatus according to another embodiment of the present invention.
Figure 4:
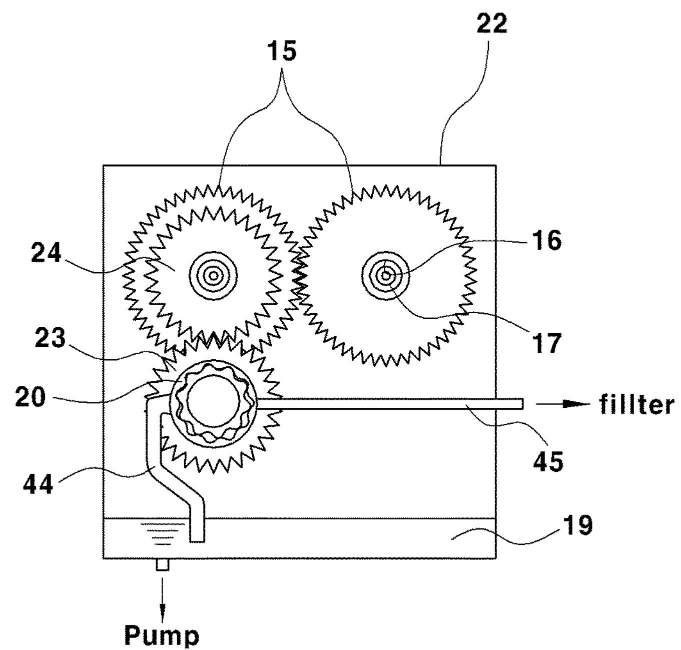
FIG. 4 is a cross-sectional view taken along line B-B of FIG. 3.

To this end, as shown in FIGS. 3 and 4, the internal oil pump 20 is supported over the oil pan 19 in the gear housing 22 and a suction pipe 44 of the oil pump 20 has an end sunk in the oil in the oil pan 19 and a discharge pipe 45 of the oil pump 20 is connected to the filter or the heat exchanger 21 though the main oil line.

A rotor-side pump driving gear 24 is fitted on the rear shaft of the rotor 13*b* and an oil pump-side pump driving gear 23 is fitted on an internal gear of the oil pump 20. The oil pump-side pump driving gear 23 and the rotor-side pump driving gear 24 can rotate in mesh with each other.

Accordingly, the oil pump 20 is operated by power generated from the rotors and transmitted by the oil pump-side pump driving gear 23 and the rotor-side pump driving gear 24, so the oil in the oil pan 19 can be sent to the main oil line connected to the filter or the heat exchanger.

The oil supply unit 18 includes the heat exchanger for cooling oil and the heat exchanger 21 may be a water-cooling heat exchanger using cooling water or a heat exchanger using a Peltier device.

For example, when the heat exchanger is a water-cooling heat exchanger using cooling water, an oil pipe 46 connected to the main oil line and a cooling water pipe 47 for cooling water are disposed in the body of the heat exchanger, and the oil pipe 46 and the cooling water pipe 47 may be in contact with each other or wound on each other.

Accordingly, heat is exchanged between the oil (that has cooled the rotors) flowing through the oil pipe 46 and cooling water flowing through the cooling water pipe 47 in the heat exchanger 21, whereby the oil can be cooled.

A first valve 48 that is controlled by the micro processor 33 may be disposed at a side of the cooling water pipe 47, so it is possible to adjust the temperature of oil by connecting/disconnecting flow of cooling water by opening/closing the first valve 48.

That is, it is possible to decrease the oil temperature by maintaining the flow of cooling water or maintain an increase in oil temperature by blocking the flow of cooling water, depending on the operation status of the pump.

Figure 5A:
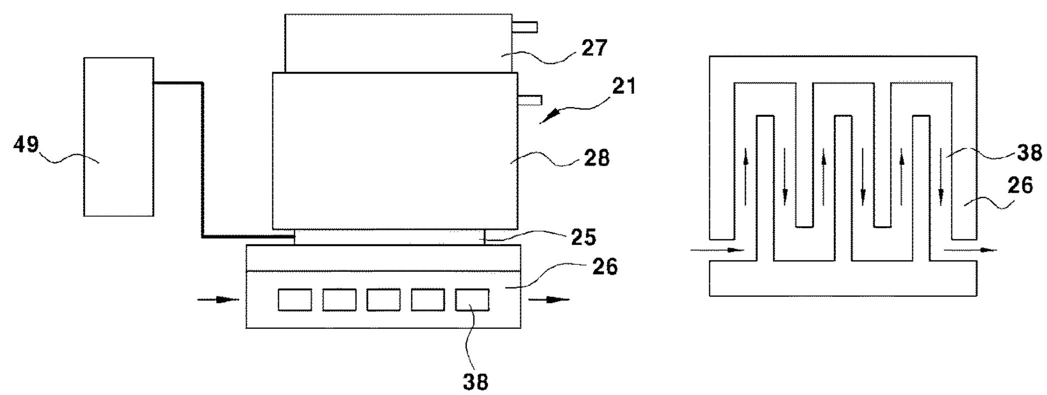
FIGS. 5*a* and 5*b* are cross-sectional views showing a heat exchanger using a Peltier device in a vacuum pump with a cooling apparatus according to an embodiment of the present invention.

When the heat exchanger is a heat exchanger that uses a Peltier device, as shown in FIG. 5*a*, a Peltier device 25 that is controlled by a power/controller 49 is provided and, an oil block 26 having a channel 38 for oil flow is disposed at a heat absorption side of the Peltier device 25 and a cooling fan 27 and a cooler 28 are disposed at a heat generation side of the Peltier device 25.

The channel 38 formed in the oil block 26 may be formed in various shapes including a zigzag shape to ensure a sufficient heat exchange area.

Accordingly, oil flows through the channel 38 of the oil block 26 connected to the main oil line and the oil can be cooled when the Peltier device 25 is operated.

The heat coming out of the heat generation side of the Peltier device 25 can be controlled by the cooling fan 27 and the cooler 28.

The Peltier device may be a common thermoelectric module, but the principle and effects are not described in detail herein.

Figure 5B:
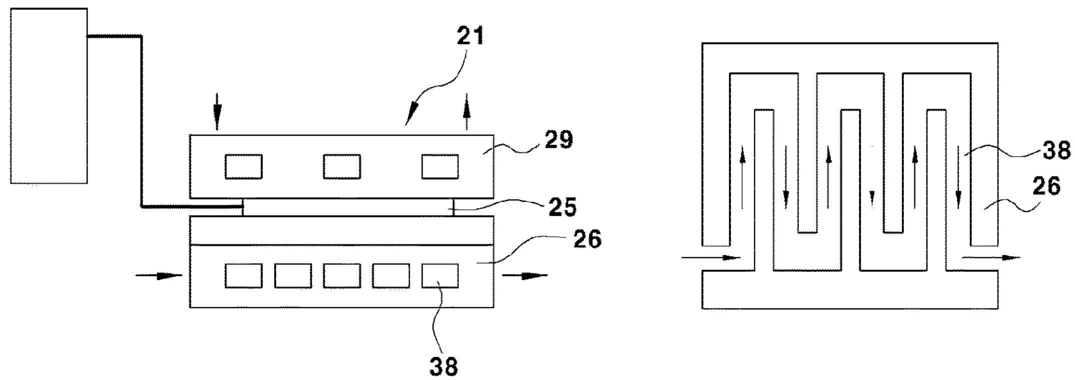

As shown in FIG. 5*b*, a Peltier device 25 that is controlled by a power/controller 49 is provided and, an oil block 26 having a channel 38 for oil flow is disposed at the heat absorption side of the Peltier device 25 and a cooling block through which cooling water is circulated is disposed at the heat generation side of the Peltier device 25.

Accordingly, oil flows through the channel 38 of the oil block 26 connected to the main oil line and the oil can be cooled when the Peltier device 25 is operated.

The heat coming out of the heat generation side of the Peltier device 25 can be controlled by the cooling water flowing through the cooling block 29.

As described above, when the heat exchanger 21 is a water-cooling heat exchanger using cooling water or a heat exchanger using a Peltier device, it is possible to control the temperature of oil at a low level by changing the cycle of supplying cooling water to the heat exchanger or switching the heat absorption side and the heat generation side depending on a polarity change of the Peltier device. Alternatively, it is possible to increase the temperature of oil when it is required to increase the temperature of the pump.

For example, by setting the side facing the oil block 26 as the heat generation side and the side facing the cooling block or the cooler as the heat absorption side by changing the polarity of the Peltier device 25, and by increasing temperature by heating the oil through the Peltier device at the early stage of operation of the vacuum pump, it is possible to smoothly lubricate the bearings and activate the pump at an appropriate temperature at the early stage of operation of the pump, whereby the operation efficiency of the pump can be increased.

Meanwhile, there is no problem with applying a heat exchanger using cooling water when a cooling water supply facility is equipped, but small factories are not equipped with a cooling water supply facility, so it is possible in this case to economically control the temperature of a vacuum pump by applying a heat exchanger using the Peltier device 25.

On the other hand, the present invention provides a way of automatically changing the temperature of oil, depending on the temperature of gas that is processed in a vacuum pump.

To this end, a first temperature sensor 31 that detects the temperature of gas is disposed at the gas inlet side of the pump housing 12, a second temperature sensor 32 that detects the temperature of oil is disposed at a portion of the main oil line of the oil supply unit 18, for example, in the front line of the heat exchanger 21, and a third temperature sensor 39 that detects the environmental temperature is disposed adjacent to the pump housing 12.

Accordingly, when temperature values detected by the first temperature sensor 31, the second temperature sensor 32, and the third temperature sensor 39 are input to the micro processor 33, the operation of the heat exchanger 21 is controlled by the micro processor 33, and for example, the cycle of supplying cooling water to the heat exchanger is changed or the operation time of the Peltier device is changed by controlling the first valve 48, so the temperature of oil can be variably controlled to fit to the operation status of the vacuum pump.

For example, assuming that the gas temperature of the first temperature sensor is about 60 degrees, when the flow rate of the gas increases, the gas temperature of the first temperature sensor gradually increases, and when the amount of gas further increases, the gas temperature increases up to about 200 degrees.

A change in gap between the pump rotor and the housing according to an increase in gas temperature is a factor that is considered when a pump is developed, so it is possible to solve the problem that the gap between the rotor and the housing decreases and the rotor and the housing come in contact with each other, by automatically adjusting oil temperature of the second temperature sensor in accordance with gas temperature or by decreasing the oil temperature as low as possible when the oil temperature is a specific temperature or higher.

Further, the environmental temperature of the third temperature sensor, that is, the environmental temperature around the pump is detected, and when the environmental temperature increases, it influences a change in the gap between the rotor and the housing, so it is possible to change the set oil temperature of the second temperature sensor on the basis of the gas temperature read from the first temperature sensor and the environmental temperature read from the third temperature sensor.

Assuming that an appropriate oil temperature is 80 degrees when the set temperature of the third temperature sensor is 24 degrees and the set temperature of the first temperature sensor is 60~100 degrees, the temperature of the second temperature sensor is set at 80 degrees by the micro processor and the temperature of 80 degrees is maintained by the Peltier device or the heat exchanger.

Further, when more gas is supplied and the temperature of the first temperature sensor is increased to 150 degrees, the set temperature of the second temperature sensor can be adjusted to 70 degrees by the micro processor, whereby it is possible to change the gap between the rotor and the housing by adjusting the oil temperature of the second temperature sensor according to the inflow rate of gas, that is, a change in gas temperature at the first temperature sensor.

The temperature at the place where a pump is installed depends on users, so as in the first example, assuming that when the first temperature sensor is at 60~100 degrees, it is the most preferable condition for maintaining the gap to maintain the appropriate oil temperature at 80 degrees, and when the environmental temperature of the third temperature sensor increases to 40 degrees, it would be required to set the oil temperature of the second temperature sensor at about 75 degrees lower than 80 degrees.

This example is provided as a rough setting method and a temperature characteristic changes, depending on the design method or the size of a pump rotor and combinations of pumps (for example, a combination of a booster pump and a dry pump), so appropriate values can be set different, depending on models.

Further, it may be possible to freely set a value for the second temperature sensor regardless of the values set for the first temperature sensor and the third temperature sensor.

Figure 6:
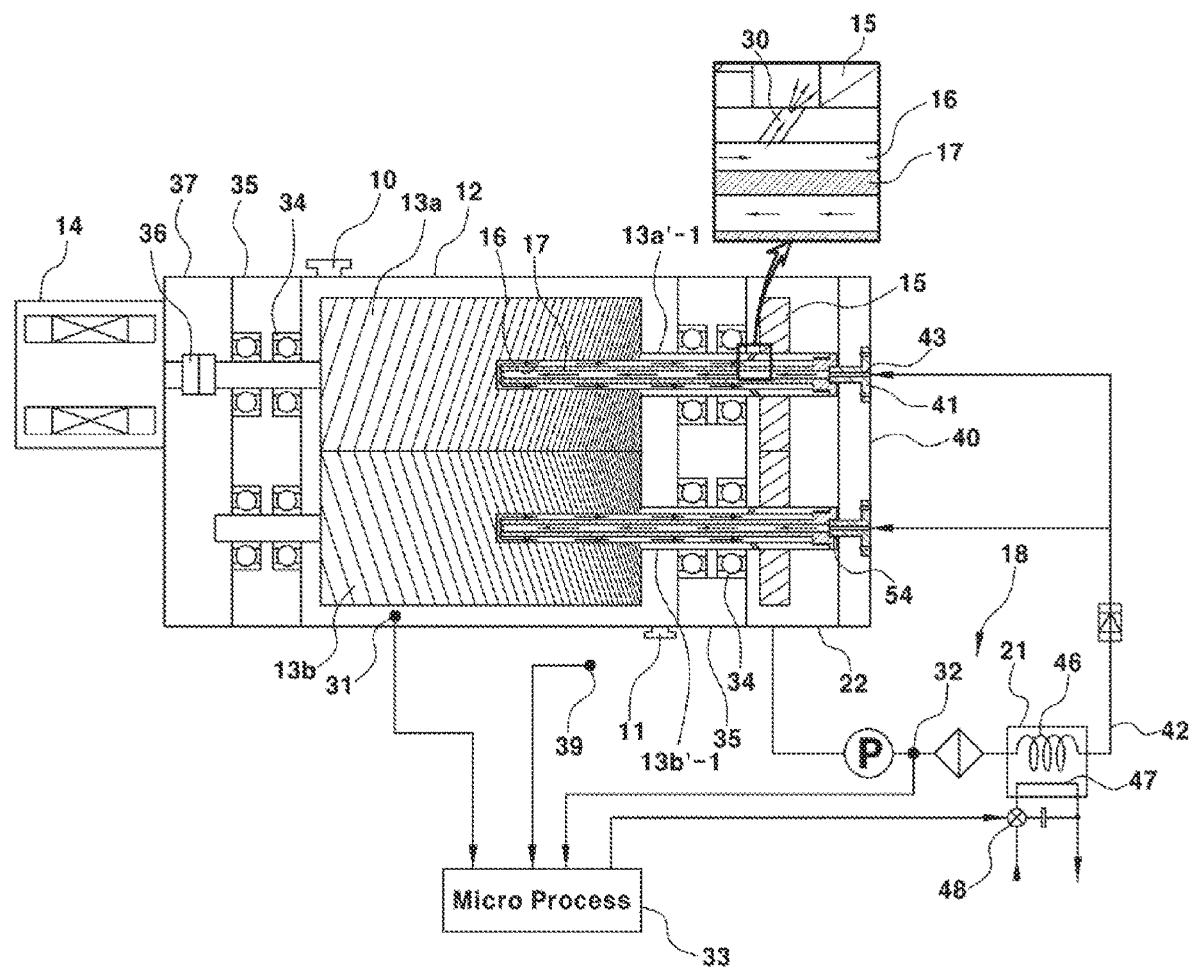
FIG. 6 is a cross-sectional view showing oil flow in a rotor of a vacuum pump with a cooling apparatus according to an embodiment of the present invention.

FIG. 6 is a cross-sectional view showing oil flow in a rotor of a vacuum pump with a cooling apparatus according to an embodiment of the present invention.

As shown in FIG. 6, in order to produce a vacuum in a process chamber when a semiconductor manufacturing facility is operated, when the motor 14 is operated, the gears 15 are rotated in mesh with each other and the pair of rotors 13*a* and 13*b* are rotated, thereby generating vacuum pressure. Further, gas discharged from the process chamber can be sent into the pump housing 12 and then discharged by the vacuum pressure, so a vacuum is made in the process chamber.

Further, when the oil pump 20 of the oil supply unit 18 is operated, the oil in the oil pan 19 flows through the main oil line, is cooled (or heated or maintained at high temperature) through the heat exchanger 21, and is supplied 15 into the holes 16 in the rotor shafts 13*a*'-1 and 13*b*'-1 through the adaptors 41, the orifices 43, and the oil supply pipes 17.

The oil supplied in the hole 16 in the rotor shafts 13*a*'-1 and 13*b*'-1 cools the bearings in addition to the rotors 13*a* and 13*b* that have been heated while flowing to the rear ends through the holes 16, that is, flowing to the rear ends through the rotors. Further, the oil that has cooled the rotors and the bearings comes out of the oil outlets 30 of the holes 16 and is sprayed to the gears 15, where by the oil cools the gears 15 and flows back into the oil pan 19 under the gears 15.

The flow of the oil is circulated through the oil pan 19→oil pump 20→heat exchanger 21→oil supply pipes 17→rotor holes 16→oil pan 19, and the rotors 13*a* and 13*b* can be effectively cooled by the continuous circulation of the oil.

Figure 7:
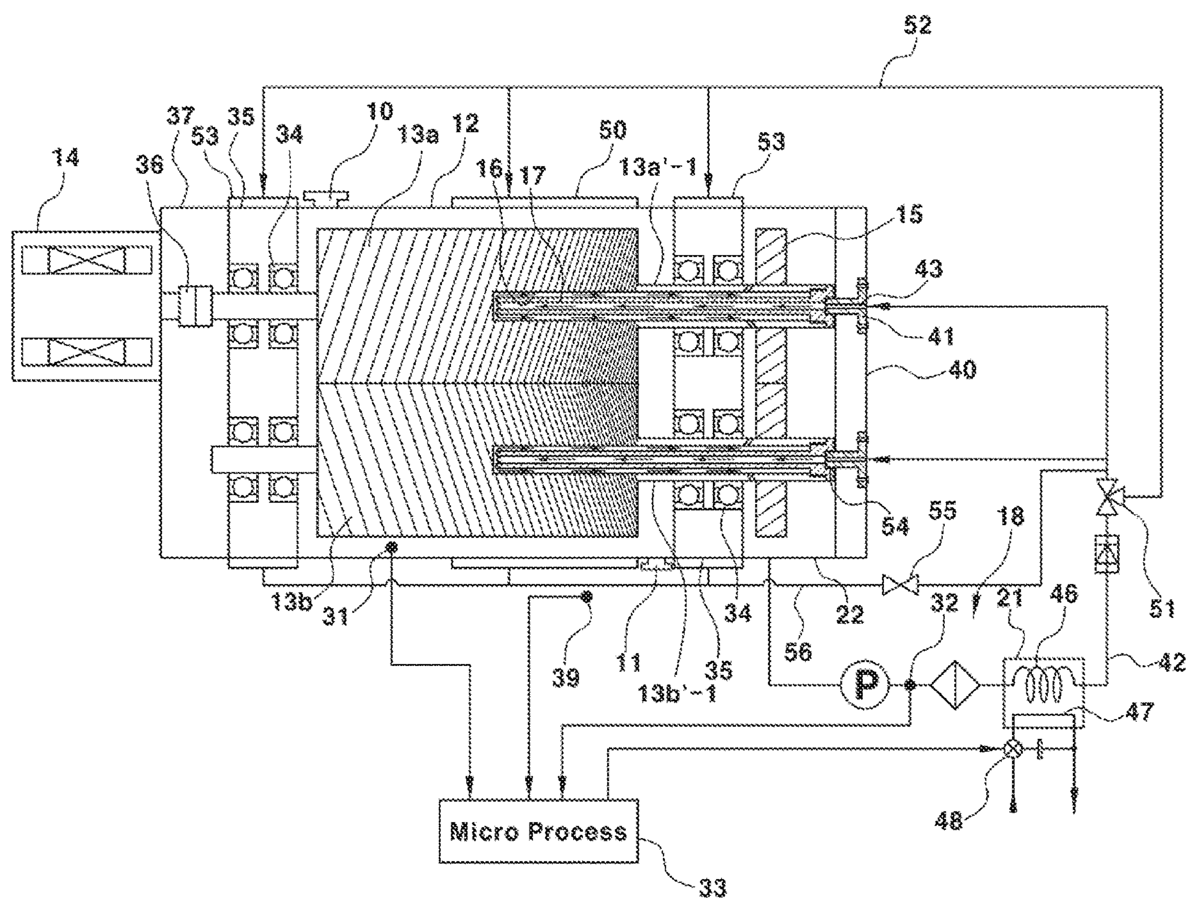
FIG. 7 is a cross-sectional view showing a vacuum pump with a cooling apparatus according to another embodiment of the present invention.

FIG. 7 is a cross-sectional view showing a vacuum pump with a cooling apparatus according to another embodiment of the present invention.

As shown in FIG. 7, when it is required to control housing temperature, a way of controlling the temperature of a housing using cooling oil is provided.

To this end, a first cooling block 50 having an internal oil channel (not shown) is disposed around a pump housing 12, that is, around the outer side of the pump housing 12 and a 3-way valve 51 is disposed at a predetermined position in a main oil line extending from an oil supply unit 18, for example, behind a heat exchanger 21.

A first sub-oil line 52 diverges from the 3-way valve 51 and is connected to a first cooling block 50 of the pump housing 12.

Accordingly, oil that is supplied from the oil supply unit 18, for example, cooling oil that finishes heat exchange is sent to the first sub-oil line 52 through the 3-way valve 51 and is then supplied to the first cooling block 50 of the pump housing 12, whereby it can cool the pump housing 12.

Further, a second sub-oil line 56 extending from the first cooling block 50 is connected to a side of the main oil line 42, for example, to the main oil line 42 behind the 3-way valve 51 and a second valve 55 that is controlled by a micro processor 33 is disposed in the second sub-oil line 56.

The second valve can be controlled to open by the micro processor 33 to cool the housing, so oil that has cooled the housing can flow from the second sub-oil line 56 to the main oil line 42 and keeps flowing to the rotors.

Obviously, a check valve that prevents oil from flowing from the main oil line 42 to the second sub-oil line 56 and allows oil to flow from the second sub-oil line 56 to the main oil line 42 may be used instead of the second valve 55.

Further, the first sub-oil line 52 diverging from the 3-way valve 51 is connected to a second cooling block 53 formed around the outer side of the bearing housing 35, for example, the second cooling block 53 having an internal oil channel (not shown) and to a cooling block (not shown) formed around the outer side of the gear housing 22. Further, similarly, according to this configuration, the cooling oil that finishes heat exchange is sent to the first sub-oil line 52 through the 3-way valve 51 and is supplied to thee second cooling block 53 of the bearing housing 35 and the cooling block of the gear housing, so it can cool the bearing housing 35 and the gear housing 22.

The second sub-oil line 56 extending from the second cooling block 53 at the bearing housing and the cooling block at the gear housing can extend to a side of the main oil line 42.

That is, the oil that has cooled the housings can come out of the cooling blocks and join the second sub-oil line 56, and then it can be sent to the main oil line.

The channels of the 3-way valve 51 can be switched by a solenoid (not shown) that is controlled by the micro processor 33, oil can be sent by opening the channel to the first sub-oil line (the channel to the rotors closed) only when the housing temperature needs to be controlled by determination of the micro processor received housing temperature detected by a temperature sensor (not shown) or gas temperature detected by the first temperature sensor, and in other cases, the channel to the rotors is opened and the channel to the first sub-oil line is closed, so oil can be sent to the rotors.

Two types of cooling control can be performed in the vacuum pump including the first sub-oil line and the second sub-oil line.

For example, when the channels of the 3-way valve is opened to the rotors and closed to the housings, oil is circulated through the oil pan 19→oil pump 20→heat exchanger 21→oil supply pipes 17→rotor holes 16→oil pan 19, whereby it can cool the rotors and the bearings.

Alternatively, when the channels of the 3-way valve is closed to the rotors and opened to the housings, oil is circulated through the oil pan 19→oil pump 20→heat exchanger 21→first sub-oil line 52→cooling blocks at housings→second sub-oil line 56→oil supply pipes 17→rotor holes 16→oil pan 19, whereby it can cool the rotors and the bearings in addition to the housings.

It may be possible to design an oil line through which rotors and the housings can be simultaneously cooled, but in this case, the temperature of the rotors and the temperature of the housings are controlled at the same temperature in accordance with the set temperature of oil, so it is difficult to perform cooling control that can satisfy both of the rotors of the housings of which cooling control characteristics are different.

However, cooling control of the rotors and cooling control of the housings and the rotors are selectively performed by appropriately switching channels or designing oil lines in an embodiment of the present invention, so it is possible to control both of the temperature of the rotors and the temperature of the housings in the optimal state by blocking oil flowing to the housings when it is required to increase the temperature of the housings.

As described above, since the present invention implements a new system that cools a vacuum pump by controlling the temperature of rotors of the vacuum pump by circulating oil through the rotors, it is possible to prevent a rapid increase in temperature of the vacuum pump, particularly, a rapid increase in temperature of the rotors. Accordingly, it is possible to ensure stability when performing processes and operating the pump and to economically maintain a semiconductor manufacturing facility.

REFERENCE NUMERALS

10: Inlet
11: Outlet
12: Pump housing
13*a*, 13*b*: Rotor
14: Motor
15: Gear
16: Hole
17: Oil supply pipe
18: Oil supply unit
19: Oil pan
20: Oil pump
21: Heat exchanger
22: Gear housing
23: Oil pump-side pump driving gear
24: Rotor-side pump driving gear
25: Peltier device
26: Oil block
27: Cooling fan
28: Cooler
29: Cooling block
30: Oil outlet
31: First temperature sensor
32: Second temperature sensor
33: Micro processor
34: Bearing
35: Bearing housing
36: Coupler
37: Coupler housing
38: Channel
39: Third temperature sensor
40: Adaptor cover
41: Adaptor
42: Oil channel
43: Orifice
44: Suction pipe
45: Discharge pipe
46: Oil pipe
47: Cooling water pipe
48: First valve
49: Power/controller
50: First cooling block
51: 3-way valve
52: First sub-oil line
53: Second cooling block
54: Adaptor seat
55: Second valve
56: Second sub-line

The invention claimed is:

1. A vacuum pump with a cooling apparatus, comprising:

a pump housing having an inlet for receiving gas and an outlet for discharging gas;

a pair of rotors supported at both ends in the pump housing and having shafts, said pair of rotors being configured to generate vacuum pressure by rotating in mesh with each other;

a motor connected to one of the shafts of the rotors to drive the rotors;

gears for cooperation between the rotors;

a first temperature sensor disposed at a gas inlet side of the pump housing to detect temperature of gas;

a second temperature sensor disposed in a main oil line of an oil supply unit to detect temperature of oil;

a third temperature sensor disposed around the pump housing to detect environmental temperature; and a micro processor variably controlling temperature of oil on a basis of temperature values input from the first temperature sensor, the second temperature sensor, and the third temperature sensor, wherein rotor holes are formed in parallel along axial lines of the rotors, oil supply pipes are disposed in the rotor holes, oil is supplied into the oil supply pipes from the oil supply unit, and the oil cools the rotors while flowing through the rotor holes.

2. The vacuum pump of claim 1, wherein the oil supply unit includes an oil pan for keeping a predetermined amount of oil, an oil pump pumping the oil in the oil pan, and a heat exchanger for heat exchange of the oil pumped into the oil supply pipes by the oil pump.

3. The vacuum pump of claim 2, wherein the oil pump of the oil supply unit is an external pump disposed outside the pump housing.

4. The vacuum pump of claim 2, wherein the oil pump of the oil supply unit is an internal pump disposed inside a gear housing of the pump housing.

5. The vacuum pump of claim 4, wherein the internal oil pump uses rotor power and is operated by power transmitted between an oil pump-side pump driving gear and a rotor-side pump driving gear that are rotated in mesh with each other.

6. The vacuum pump of claim 1, wherein the oil supply unit has an oil circulation configuration including the main oil line extending from an oil pan, through an oil pump, a heat exchanger, the oil supply pipes, the rotor holes, and back to the oil pan in the gear housing.

7. The vacuum pump of claim 1, wherein a heat exchanger of the oil supply unit is a water-cooling heat exchanger using cooling water.

8. The vacuum pump of claim 1, wherein a heat exchanger of the oil supply unit is a heat exchanger using a Peltier device.

9. The vacuum pump of claim 8, wherein an oil block is disposed at an heat absorption side of the Peltier device, and a cooling fan and a cooler are disposed at a heat generation side of the Peltier device in the heat exchanger using the Peltier device.

10. The vacuum pump of claim 8, wherein an oil block is disposed at an heat absorption side of the Peltier device and a cooling block through which cooling water can flow is disposed at a heat generation side of the Peltier device in the heat exchanger using the Peltier device.

11. The vacuum pump of claim 1, wherein an oil outlet though which oil that has finished cooling comes out is formed at the rotor holes formed in the shafts of the rotors and the oil outlets are positioned close to the gears fitted on the shafts of the rotors so that the oil discharged from the oil outlets is sprayed to the gears and cools the gears.

12. The vacuum pump of claim 1, wherein when a heat exchanger is a heat exchanger using a Peltier device, the micro processor performs control of heating oil by changing polarities of the Peltier device at an early stage of operation of the pump.

13. The vacuum pump of claim 1, wherein a first cooling block is disposed around the pump housing, a 3-way valve is disposed in the main oil line extending from the oil supply unit, and a first sub-oil line diverging from the 3-way valve is connected to the first cooling block of the pump housing so that the pump housing is configured to be cooled by the oil supplied to the first cooling block.

14. The vacuum pump of claim 13, wherein the first sub-oil line is divided into a plurality of lines and connected to a second cooling block formed around bearing housings so that the bearing housings are configured to be cooled by the oil supplied to the second cooling block.

15. The vacuum pump of claim 13, wherein a second sub-oil line extends from the first cooling block and is connected to the main oil line behind the 3-way valve so that the rotors are configured to be cooled after the pump housing is cooled.

* * * * *